United States Patent
Abe et al.

(10) Patent No.: US 12,009,865 B2
(45) Date of Patent: *Jun. 11, 2024

(54) OPTICAL TRANSMITTER, OPTICAL COMMUNICATION SYSTEM, AND OPTICAL COMMUNICATION METHOD

(71) Applicant: NEC Corporation, Tokyo (JP)

(72) Inventors: Junichi Abe, Tokyo (JP); Tatsuya Nakamura, Tokyo (JP)

(73) Assignee: NEC ASIA PACIFIC PTE LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/899,786

(22) Filed: Aug. 31, 2022

(65) Prior Publication Data

US 2022/0416903 A1 Dec. 29, 2022

Related U.S. Application Data

(63) Continuation of application No. 17/148,829, filed on Jan. 14, 2021, now Pat. No. 11,476,943, which is a
(Continued)

(30) Foreign Application Priority Data

Oct. 10, 2014 (JP) .................................. 2014-209346
Apr. 23, 2015 (JP) .................................. 2015-088334

(51) Int. Cl.
*H04B 10/25* (2013.01)
*H04B 10/516* (2013.01)
(Continued)

(52) U.S. Cl.
CPC ..... *H04B 10/516* (2013.01); *H04B 10/25891* (2020.05); *H04L 27/36* (2013.01); *H04L 27/38* (2013.01)

(58) Field of Classification Search
CPC ............ H04B 10/516; H04B 10/25891; H04B 10/5161; H04B 10/541; H04L 27/36; H04L 27/38
See application file for complete search history.

(56) References Cited

U.S. PATENT DOCUMENTS 8,259,871 B2  9/2012 Hosokawa et al.
8,291,281 B2  10/2012 Yoshii et al.
(Continued)

FOREIGN PATENT DOCUMENTS

EP  2571217 A1  3/2013
EP  2498432 B1  6/2014
(Continued)

OTHER PUBLICATIONS

Alan E. Willner, "All-Optical Signal Processing", Jan. 10, 2014, Journal of Lightwave Technology, vol. 32, No. 4, Feb. 15, 2014, pp. 660-676.*

(Continued)

*Primary Examiner* — Omar S Ismail
(74) *Attorney, Agent, or Firm* — Sughrue Mion, PLLC

(57) ABSTRACT

If a configuration is employed in which modulation schemes used for an optical communication system can be switched depending on transmission conditions, the power consumption increases and the control becomes complex; therefore, an optical transmitter according to an exemplary aspect of the present invention includes an encoding means for encoding digital signals to be transmitted under a predetermined transmission condition over an optical carrier wave by using one of a plurality of encoding methods; an encoding control means for selecting a predetermined encoding method corresponding to the predetermined transmission condition from among the plurality of encoding methods and causing the encoding means to operate in accordance with the predetermined encoding method; a mapping means for mapping-
(Continued)

ping output bit signals output from the encoding means to modulation symbols; and an optical modulation means for modulating the optical carrier wave based on symbol signals output from the mapping means.

18 Claims, 12 Drawing Sheets

Related U.S. Application Data continuation of application No. 16/872,491, filed on May 12, 2020, now Pat. No. 10,924,188, which is a continuation of application No. 16/438,161, filed on Jun. 11, 2019, now Pat. No. 10,693,560, which is a continuation of application No. 16/120,989, filed on Sep. 4, 2018, now Pat. No. 10,361,789, which is a continuation of application No. 15/517,767, filed as application No. PCT/JP2015/005059 on Oct. 5, 2015, now Pat. No. 10,097,275.

(51) Int. Cl.
  *H04L 27/36* (2006.01)
  *H04L 27/38* (2006.01)

(56) References Cited

U.S. PATENT DOCUMENTS

| | | | |
|---|---|---|---|
| 8,401,403 B2 | 3/2013 | Rollins et al. | |
| 9,344,187 B2* | 5/2016 | Handelman | H04B 10/61 |
| 9,698,939 B2* | 7/2017 | Oveis Gharan | H04B 10/516 |
| 10,097,275 B2 | 10/2018 | Abe | H04L 27/38 |
| 10,361,789 B2 | 7/2019 | Abe et al. | |
| 10,924,188 B2* | 2/2021 | Abe | H04B 10/25891 |
| 11,546,064 B2* | 1/2023 | Inui | H04L 1/0009 |
| 11,546,272 B2* | 1/2023 | Bandic | G06F 3/0647 |
| 2003/0067991 A1 | 4/2003 | Okamoto | |
| 2005/0086341 A1* | 4/2005 | Enga | G01D 4/004 |
| | | | 709/224 |
| 2008/0037997 A1 | 2/2008 | Yamazaki et al. | |
| 2010/0061470 A1* | 3/2010 | Wei | H04Q 11/0062 |
| | | | 398/45 |
| 2010/0158530 A1 | 6/2010 | Soto et al. | |
| 2011/0293266 A1* | 12/2011 | Aoki | H04B 10/5161 |
| | | | 398/25 |
| 2012/0099871 A1 | 4/2012 | Kamakura et al. | |
| 2013/0058642 A1 | 3/2013 | Bouda | |
| 2013/0209091 A1* | 8/2013 | Mateosky | H04B 10/516 |
| | | | 398/25 |
| 2014/0003813 A1 | 1/2014 | Pfau et al. | |
| 2014/0369680 A1* | 12/2014 | Oveis Gharan | H04L 1/0003 |
| | | | 398/25 |
| 2015/0078739 A1* | 3/2015 | Handelman | H04B 10/032 |
| | | | 398/2 |
| 2016/0043805 A1* | 2/2016 | Kakande | H04J 14/02 |
| | | | 398/43 |
| 2016/0105236 A1* | 4/2016 | Zhang | H04B 10/616 |
| | | | 398/140 |
| 2017/0117969 A1* | 4/2017 | Fludger | H04B 10/6164 |
| 2017/0310394 A1* | 10/2017 | Nakashima | H04B 10/616 |
| 2018/0069632 A1* | 3/2018 | Voois | H04B 10/40 |
| 2019/0146303 A1* | 5/2019 | Cavaliere | G02F 1/225 |
| | | | 359/260 |

FOREIGN PATENT DOCUMENTS

| | | | |
|---|---|---|---|
| EP | 2930866 A1 | 10/2015 | |
| JP | 2003-087345 A | 3/2003 | |
| JP | 2007-311691 A | 11/2007 | |
| JP | 2009-105748 A | 5/2009 | |
| JP | 2011-514736 A | 5/2011 | |
| JP | 2011-250291 A | 12/2011 | |
| JP | 2013-168746 A | 8/2013 | |
| JP | 2014-007562 A | 1/2014 | |
| JP | 2014-007642 A | 1/2014 | |
| JP | 2014-103501 A | 6/2014 | |
| JP | 2014-146915 A | 8/2014 | |
| WO | 2013/056734 A1 | 4/2013 | |
| WO | WO-2016056220 A1 * | 4/2016 | H04B 10/2504 |

OTHER PUBLICATIONS

L. Meder, "Flexible real-time transmitter at 10 Gbit/s for SCFDMA PONs focusing on low-cost ONUs, "Jun. 1, 2015, Proceedings of the 2014 Conference on Design and Architectures for Signal and Image Processing,pp. 1-7.*
William Shieh, "OFDM for Flexible High-Speed Optical Networks, "May 6, 2011, Journal of Lightwave Technology, vol. 29, No. 10, May 15, 2011,pp. 1560-1573.*
Gottfried Ungerboeck, "Channel Coding with Multilevel/Phase Signals, "IEEE Transactions on INFORhtATION Theory, vol. IT-28, No. 1, Jan. 1982,pp. 55-66.*
Gwang-Hyun Gho et al., "Rate-Adaptive Coding for Optical Fiber Transmission Systems", Jan. 15, 2011, Journal of Lightwave Technology, vol. 29, No. 2, pp. 222-233.*
Hussam G. Batshon, "Multidimensional Coded Modulation for High-Spectrally Efficient Optical Transmission", Dec. 22, 2011,2011, IEEE, pp. 155-156.*
JP Office Action for JP Application No. 2022-005096, dated Jan. 31, 2023 with English Translation.
G. Ungerboeck, "Channel coding with multilevel/phase signals", IEEE Transactions on Information Theory, IEEE, Jan. 1982, vol. 28, Issue 1, pp. 55-67.
Japanese Office Communication for JP Application No. 2020-104553 dated Dec. 21, 2021 with English Translation.
Japanese Office Action for JP Application No. 2020-104553 dated May 18, 2021 with English Translation.
Coelho, Leonardo D., and Hank, Norbert, "Global Optimization of Fiber-Optic Communication Systems using Four-Dimensional Modulation Formats", in European Conference on Optical Communications (ECOC 2011) Technical Digest, paper No. 2 B.4, 3 pages.
Extended European Search Report issued in European Patent Application No. 15849064.9, dated May 11, 2018, 8 pages.
International Search Report corresponding to PCT/JP2015/005059, 2 pages, Nov. 2, 2015.
Ishimura, Shota and Kikuchi, Kazuro, 8-State Trellis-Coded Optical Modulation with 4-Dimensional QAM Constellations, In: OECC / ACOFT 2014 Jul. 6-10, 2014. ISBN 976-1-922107-21-3, p. 1013-1015.
Renaudler, J., et al.; "Comparison of Set-Partitioned Two-Polarization 16QAM Formats with PDM-OPSK and PDM-8QAM for Optical Transmission Systems with Error-Correcting Coding", in European Conference on Optical Communications (ECOC 2012), Technical Digest paper We.1.C.5., 3 pages.
Written Opinion of the International Search Authority corresponding to PCT/JP2015/005059 with English translation. 7 pages, dated Nov. 2, 2015.
Altera Corporation, "Constellation Mapper and Demapper for WiMAX", May 2007, version 1.1, Application Note 439, pp. 1-14.
Javier Cano Adalid, "Modulation Format Conversion in Future Optical Networks", Research Center COM Technical University of Denmark, Mar. 2009, pp. 1-111.
Hussam G. Batshon, "Multidimensional Coded Modulation for High-Spectrally Efficient Optical Transmission", 2011, IEEE, pp. 155-156.
Gwang-Hyun Gho et al., "Rate-Adaptive Coding for Optical Fiber Transmission Systems", Journal of Lightwave Technology, vol. 29, No. 2, Jan. 15, 2011, pp. 222-233.

* cited by examiner

16QAM

SP8-16QAM $$B_1 = b_1$$
$$B_2 = b_2$$
$$B_3 = b_3 + b_4 * \overline{b_7}$$
$$B_4 = \overline{b_3} + \overline{b_4} * \overline{b_7}$$
$$B_5 = b_5$$
$$B_6 = b_6$$
$$B_7 = b_4 + \overline{b_3} * b_7$$
$$B_8 = \overline{b_4} + b_3 * b_7$$

OPTICAL TRANSMITTER, OPTICAL COMMUNICATION SYSTEM, AND OPTICAL COMMUNICATION METHOD

CROSS-REFERENCE TO RELATED APPLICATIONS

The present application is a continuation application of U.S. patent application Ser. No. 17/148,829 filed on Jan. 14, 2021, which is a continuation application of U.S. patent application Ser. No. 16/872,491 filed on May 12, 2020, which is issued as U.S. Pat. No. 10,924,188, which is a continuation application of U.S. patent application Ser. No. 16/438,161 filed on Jun. 11, 2019, which is issued as U.S. Pat. No. 10,693,560, which is a continuation application of U.S. patent application Ser. No. 16/120,989 filed on Sep. 4, 2018, which is issued as U.S. Pat. No. 10,361,789, which is a continuation application of U.S. patent application Ser. No. 15/517,767 filed on Apr. 7, 2017, which is issued as U.S. Pat. No. 10,097,275, which is a national stage application of International Application No. PCT/JP2015/005059 filed on Oct. 5, 2015, which claims the benefit of the priority of Japanese Patent Application No. 2014-209346 filed on Oct. 10, 2014, and Japanese Patent Application No. 2015-088334 filed on Apr. 23, 2015, the disclosures of each of which are hereby incorporated by reference in their entirety.

TECHNICAL FIELD

The present invention relates to optical transmitters, optical communication systems, and optical communication methods, in particular, to an optical transmitter, an optical communication system, and an optical communication method that perform optical coded modulation using digital signals.

BACKGROUND ART

It is important in an optical communication system using optical fibers to increase the receiving sensitivity and the frequency utilization efficiency per optical fiber in order to achieve a long-distance and large-capacity communication. It has been proposed to switch various modulation schemes that differ in the reachable transmission distance and the frequency utilization efficiency depending on a transmission distance and a transmission capacity that are required because the optical communication has a trade-off relationship between increase in transmission distance and improvement in frequency utilization efficiency. Examples of modulation schemes that differ in the reachable transmission distance and the frequency utilization efficiency include BPSK (binary phase shift keying), QPSK (quadrature phase shift keying), 8QAM (quadrature amplitude modulation), and 16QAM.

One example of optical transmitters that are used switching modulation schemes is described in Patent Literature 1. The related optical transmitter described in Patent Literature 1 includes a client accommodation unit, a variable frame mapping unit, a variable coder, an optical modulation unit, and a transmission method setting unit.

The client accommodation unit terminates a client signal transmitted from a client. The variable frame mapping unit allocates the client signal terminated by the client accommodation unit to a predetermined transmission frame. At this time, the variable frame mapping unit performs mapping in accordance with a transmission method selected by the transmission method setting unit.

The variable coder generates a modulation signal used for carrying the transmission frame generated by the variable frame mapping unit. At this time, the variable coder generates the modulation signal in accordance with the transmission method selected by the transmission method setting unit. The optical modulation unit generates a modulated optical signal from the modulation signal generated by the variable coder and outputs the modulated optical signal. At this time, the optical modulation unit generates the modulated optical signal in accordance with the transmission method selected by the transmission method setting unit.

The transmission method setting unit selects a transmission method corresponding to a transmission rate of the client signal from among a plurality of transmission methods provided by the optical transmitter. In addition, the transmission method setting unit notifies the variable frame mapping unit, the variable coder, and the optical modulation unit of transmission method information indicating the selected transmission method.

As mentioned above, the related optical transmitter is configured to transmit a client signal using the transmission method corresponding to the transmission rate of the client signal. It is said that this configuration enables the transmission efficiency to be improved because the transmission amount of a useless signal is small even though the transmission rate of the client signal is low.

Other related techniques are described in Patent Literature 2 to Patent Literature 4.

CITATION LIST

Patent Literature

PTL 1: Japanese Patent Application Laid-Open Publication No. 2011-250291 (Paragraphs [0016] to [0025])
PTL 2: Japanese Patent Application Laid-Open Publication No. 2003-087345
PTL 3: Japanese Patent Application Laid-Open Publication No. 2009-105748
PTL 4: Japanese Patent Application Laid-Open Publication No. 2011-514736

Non Patent Literature

NPL 1: Leonardo D. Coelho and Norbert Hanik, "Global Optimization of Fiber-Optic Communication Systems using Four-Dimensional Modulation Formats", in European Conference on Optical Communications (ECOC 2011), Technical Digest, paper Mo.2.B.4.
NPL 2: J. Renaudier, A. Voicila, O. Bertran-Pardo, O. Rival, M. Karlsson, G. Charlet, and S. Bigo, "Comparison of Set-Partitioned Two-Polarization 16QAM Formats with PDM-QPSK and PDM-8QAM for Optical Transmission Systems with Error-Correction Coding", in European Conference on Optical Communications (ECOC 2012), Technical Digest, paper We.1.C.5.

SUMMARY OF INVENTION

Technical Problem

If a single optical transmitter is used switching between a plurality of modulation schemes such as BPSK, QPSK, 8QAM, and 16QAM as the above-mentioned related optical transmitter, it is necessary to implement a signal processing circuit with a plurality of algorithms and bit precisions that correspond to the plurality of modulation schemes. Consequently, there has been the problem that the power consumption of the optical transmitter and an optical receiver increases and the control of them becomes complex.

As mentioned above, there has been the problem that, if a configuration is employed in which modulation schemes used for an optical communication system can be switched depending on transmission conditions, the power consumption increases and the control becomes complex.

The object of the present invention is to provide an optical transmitter, an optical communication system, and an optical communication method that solve the above-mentioned problem that, if a configuration is employed in which modulation schemes used for an optical communication system can be switched depending on transmission conditions, the power consumption increases and the control becomes complex.

Solution to Problem

An optical transmitter according to an exemplary aspect of the present invention includes an encoding means for encoding digital signals to be transmitted under a predetermined transmission condition over an optical carrier wave by using one of a plurality of encoding methods; an encoding control means for selecting a predetermined encoding method corresponding to the predetermined transmission condition from among the plurality of encoding methods and causing the encoding means to operate in accordance with the predetermined encoding method; a mapping means for mapping output bit signals output from the encoding means to modulation symbols; and an optical modulation means for modulating the optical carrier wave based on symbol signals output from the mapping means.

An optical communication system according to an exemplary aspect of the present invention includes an optical transmitter configured to send out a modulated optical signal to an optical transmission medium; and an optical receiver configured to receive the modulated optical signal propagated through the optical transmission medium, wherein the optical transmitter includes an encoding means for encoding digital signals to be transmitted under a predetermined transmission condition over an optical carrier wave by using one of a plurality of encoding methods, an encoding control means for selecting a predetermined encoding method corresponding to the predetermined transmission condition from among the plurality of encoding methods and causing the encoding means to operate in accordance with the predetermined encoding method, a mapping means for mapping output bit signals output from the encoding means to modulation symbols, and an optical modulation means for modulating the optical carrier wave based on symbol signals output from the mapping means and outputting an optical modulated signal, wherein the optical receiver includes a photoelectric conversion means for receiving and converting the optical modulated signal into an electrical signal and outputting a received signal, a demapping means for demapping the received signal and outputting a received bit signal, a decoding means for receiving input of the received bit signal and decoding the received bit signal by using one of a plurality of decoding methods, and a decoding control means for selecting a predetermined decoding method from among the plurality of decoding methods and causing the decoding means to operate in accordance with the predetermined decoding method.

An optical communication method according to an exemplary aspect of the present invention includes encoding digital signals to be transmitted under a predetermined transmission condition over an optical carrier wave by selecting a predetermined encoding method corresponding to the predetermined transmission condition; generating symbol signals by mapping encoded bit signals to modulation symbols; and generating an optical modulated signal obtained by modulating the optical carrier wave based on the symbol signals.

Advantageous Effects of Invention

According to the optical transmitter, the optical communication system, and the optical communication method of the present invention, it is possible to achieve low power consumption and easy control even though a configuration is employed in which modulation schemes used for an optical communication system can be switched depending on transmission conditions.

EXAMPLE EMBODIMENT

Figure 1:
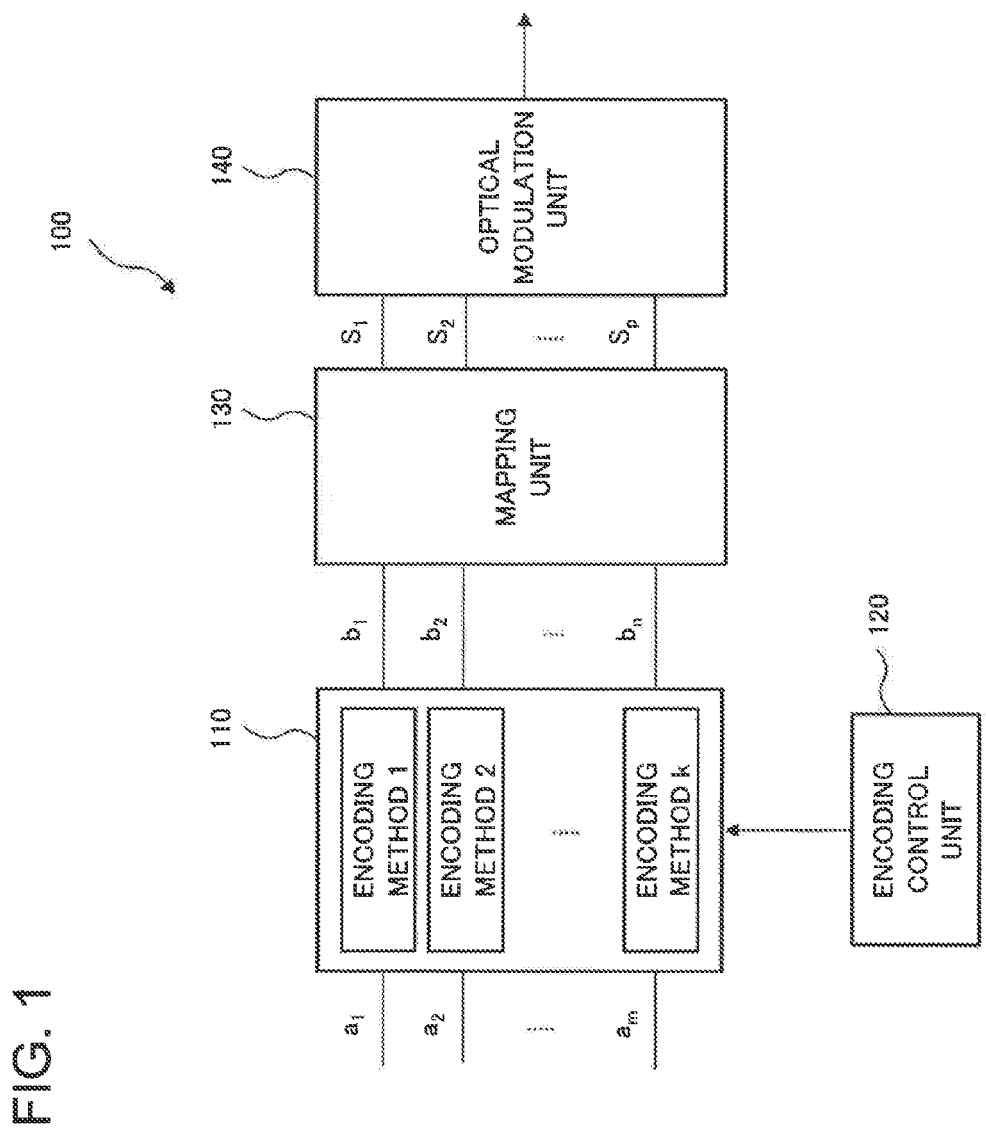
FIG. 1 is a block diagram illustrating a configuration of an optical transmitter according to a first example embodiment of the present invention.

Example embodiments of the present invention will be described below with reference to the drawings. The directions of arrows in the drawings are illustrative and do not limit the directions of signals between blocks.

A First Example Embodiment

FIG. 1 is a block diagram illustrating a configuration of an optical transmitter 100 according to a first example embodiment of the present invention. The optical transmitter 100 includes an encoder 110, an encoding control unit 120, a mapping unit 130, and an optical modulation unit 140.

The encoder 110 encodes digital signals to be transmitted under a predetermined transmission condition over an optical carrier wave by using one of a plurality of encoding methods. The encoding control unit 120 selects a predetermined encoding method corresponding to the predetermined transmission condition from among the plurality of encoding methods and causes the encoder 110 to operate in accordance with the predetermined encoding method. The mapping unit 130 maps output bit signals output from the encoder 110 to modulation symbols. The optical modulation unit 140 modulates the optical carrier wave based on symbol signals output from the mapping unit 130.

Next, the operation of the optical transmitter 100 according to the present example embodiment will be described.

M-bit digital signals $a_1$-$a_m$ inputted into the optical transmitter 100 are inputted into the encoder 110. The encoder 110 encodes the digital signals in accordance with an encoding method set by the encoding control unit 120, and outputs n-bit bit sequence $b_1$-$b_n$ of output bit signals. The mapping unit 130 maps the bit sequence $b_1$-$b_n$ to symbols and outputs a data sequence of p elements (dimensions), $S_1$, $S_2$, ..., $S_p$, each of which is a symbol signal, to the optical modulation unit 140.

The optical modulation unit 140 performs optical modulation based on respective data of $S_1$, $S_2$, ..., $S_p$ and outputs a transmission optical signal on which an optical coded modulation has been performed. The optical modulation unit 140 includes a D/A converter (digital-to-analog converter), a modulator driver, an optical modulator, and a light source, which are not shown in the figure.

The encoder 110 is capable of selecting and setting a predetermined encoding method from among k encoding methods, from encoding method 1 to encoding method k, as illustrated in FIG. 1. The encoder 110 may be configured to perform encoding by using one of a plurality of convolutional encoding methods that differ in at least one of a generating polynomial, a constraint length, and a code rate in convolutional encoding methods. In this case, the encoding control unit 120 selects the predetermined encoding method by setting at least one of the generating polynomial, the constraint length, and the code rate. In other words, the encoding control unit 120 can select and set a preferable encoding method from among encoding method 1 to encoding method k depending on a predetermined transmission condition such as a transmission distance and a transmission capacity that is required for each communication.

At least one of a transmission capacity, a transmission distance, an error rate, and an optical signal-to-noise ratio can be used as the above-mentioned transmission condition.

The symbol signals with which the optical modulation unit 140 is driven, that is, a data sequence of $S_1$, $S_2$, ..., $S_p$, can be signals with at least one dimension of dimensions including optical phase (I component and Q component), polarization (X polarization component and Y polarization component), wavelength of the optical carrier wave, and time. It is possible to perform high-dimensional optical coded modulation by combining the plurality of dimensions.

An optical modulator constituting the optical modulation unit 140 is composed of a material including at least one of a ferroelectric material such as lithium niobate ($LiNbO_3$), and a semiconductor material. By using the optical modulator alone or those optical modulators in combination, digital signals can be transmitted multiplexed by at least one of polarization multiplexing, wavelength multiplexing, and time-division multiplexing.

Next, an optical communication method according to the present example embodiment will be described.

In the optical communication method according to the present example embodiment, first, digital signals to be transmitted under a predetermined transmission condition over an optical carrier wave are encoded by selecting a predetermined encoding method corresponding to the predetermined transmission condition. Then symbol signals are generated by mapping encoded bit signals to modulation symbols. Lastly, an optical modulated signal is generated that is obtained by modulating the optical carrier wave based on the symbol signals.

As mentioned above, the optical transmitter 100 and the optical communication method according to the present example embodiment are configured to encode digital signals by selecting a predetermined encoding method corresponding to a predetermined transmission condition. This configuration makes it possible to select a preferable modulation scheme corresponding to a predetermined transmission condition only by changing an encoding method. This enables a change in digital signal processing to be minimized. As a result, it is possible to achieve low power consumption and easy control even though a configuration is employed in which modulation schemes used for an optical communication system can be switched depending on transmission conditions.

A Second Example Embodiment

Figure 2:
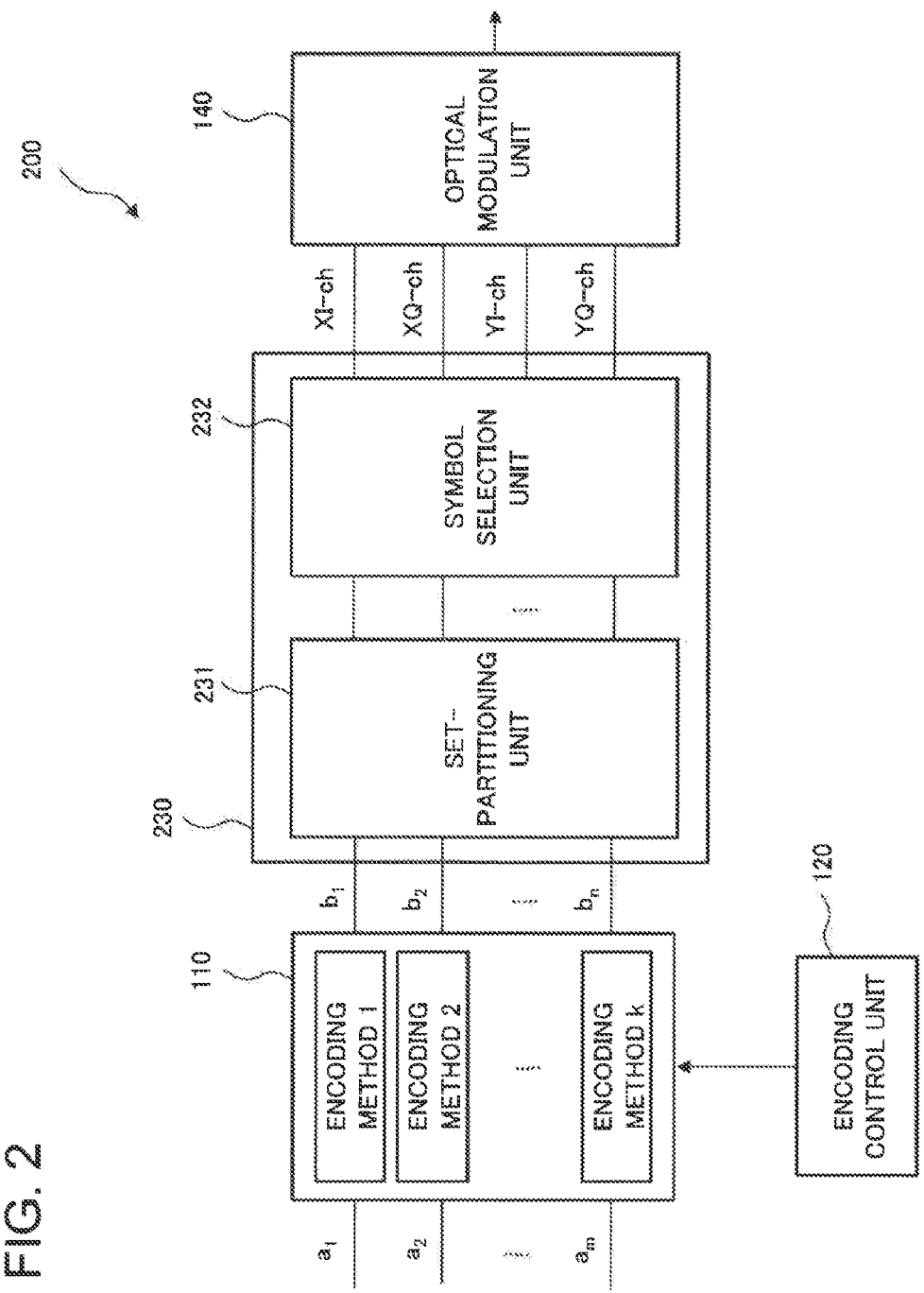
FIG. 2 is a block diagram illustrating a configuration of an optical transmitter according to a second example embodiment of the present invention.

Next, a second example embodiment of the present invention will be described. FIG. 2 is a block diagram illustrating a configuration of an optical transmitter 200 according to the second example embodiment of the present invention.

The optical transmitter 200 includes an encoder 110, an encoding control unit 120, a mapping unit 230, and an optical modulation unit 140. The mapping unit 230 in the optical transmitter 200 according to the present example embodiment includes a set-partitioning unit 231 and a symbol selection unit 232. All remaining configurations are the same as those of the optical transmitter 100 according to the first example embodiment, so their detailed description will be omitted.

The set-partitioning unit 231 partitions modulation symbols into a plurality of subsets and selects a subset included in the plurality of subsets based on output bit signals. The symbol selection unit 232 selects one modulation symbol from among the modulation symbols included in a selected subset that is selected by the set-partitioning unit 231 based on the output bit signals and maps the output bit signals to a selected modulation symbol.

Next, the operation of the optical transmitter 200 according to the present example embodiment will be described.

The encoder 110 receives input of m-bit digital signals $a_1$-$a_m$ inputted into the optical transmitter 200. The encoder 110 encodes the digital signals in accordance with an encoding method that is set by the encoding control unit 120, and then outputs an n-bit bit sequence $b_1$-$b_n$ of output bit signals.

The bit sequence $b_1$-$b_n$ is mapped to symbols in the mapping unit 230, and then inputted into the optical modulation unit 140 as data sequences of XI-ch and XQ-ch that are optical phase components of X polarization and data sequences of YI-ch and YQ-ch that are optical phase components of Y polarization, for example. The optical modulation unit 140 performs optical modulation based on respective data of XI-ch, XQ-ch, YI-ch, and YQ-ch, and outputs a transmission optical signal on which an optical coded modulation has been performed.

The set-partitioning unit 231 partitions a constellation of a two-dimensional or higher dimensional QAM modulation into L sub-constellations (states) based on the set-partitioning method. Then the set-partitioning unit 231 selects one of the above-mentioned L sub-constellations (states) using an encoded α bits in the bit sequence $b_1$-$b_n$. The symbol selection unit 232 selects one preferable symbol from among the selected sub-constellation using β bits that have not been encoded and are included in the bit sequence $b_1$-$b_n$, and outputs data corresponding to XI-ch, XQ-ch, YI-ch, and YQ-ch.

The set-partitioning (SP) method described above is the method that the minimum distance between codes is extended by thinning out nearest neighboring points from symbol points. For example, Non Patent Literature 1 discloses an SP-16QAM modulation in which symbol partitioning in accordance with the set-partitioning is performed on symbols that are mapped into a four-dimensional signal space of phase information and polarization information. The distance between symbols is extended by using the set-partitioning, which enables receiving sensitivity to improve.

Next, the operation of the encoder 110 will be specifically described.

Figure 3A:
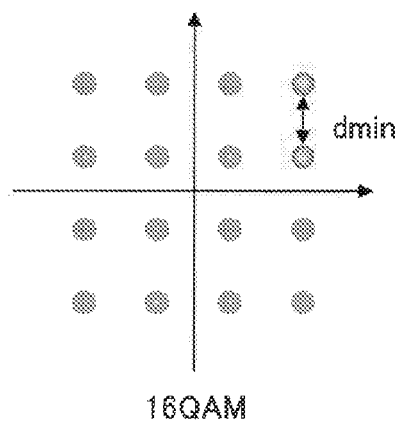
FIG. 3A is a constellation diagram to explain a case where set-partitioning is used as an encoding method for a 16QAM signal in the optical transmitter according to the second example embodiment of the present invention, and a constellation diagram in accordance with ordinary 16QAM modulation.
Figure 3B:
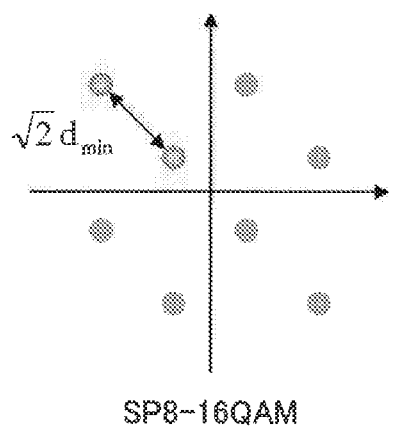
FIG. 3B is a constellation diagram to explain a case where set-partitioning is used as an encoding method for a 16QAM signal in the optical transmitter according to the second example embodiment of the present invention, and a constellation diagram in accordance with SP8-16QAM modulation.

FIG. 3A and FIG. 3B are constellation diagrams to explain a case where the above-mentioned set-partitioning is used as the encoding method for two-dimensional 16QAM signals. FIG. 3A is a constellation diagram of ordinary 16QAM, where the minimum distance between symbols is represented by $d_{min}$. FIG. 3B is a constellation diagram illustrating symbol mapping by using SP8-16QAM encoding modulation where symbols are alternately thinned out from the 16QAM constellation illustrated in FIG. 3A. It can be seen that, in this case, the receiving sensitivity improves because the minimum distance between symbols expands to $2^{1/2}d_{min}$.

In the SP8-16QAM encoding method illustrated in FIG. 3B, the code rate "r" reduces by half to ½ because symbols are thinned out. Accordingly, the transmission rate decreases. Consequently, the encoding control unit 120 can select the encoding method by ordinary 16QAM illustrated in FIG. 3A for the application to which the transmission rate (capacity) is more important. On the other hand, to the application requiring long-distance transmission, the encoding control unit 120 can select the encoding method by SP8-16QAM illustrated in FIG. 3B. In this way, the encoding control unit 120 can select an encoding method corresponding to a transmission condition from among encoding methods such as ordinary 16QAM (SP16-16QAM) without thinning out a symbol, SP8-16QAM described above, and SP4-16QAM obtained by further thinning out symbols from SP8-16QAM.

In the above description, the set-partitioning in two-dimensional 16QAM on a simple I-Q plane has been described for simplicity. Without being limited to this, it is possible to use other modulation schemes such as four-dimensional PM-16QAM expanded by adding two dimensions of X polarization and Y polarization using polarization multiplexing (PM).

In the case of four-dimensional PM-16QAM, because symbol points can be created by combining 16 symbols for X polarization (XI, XQ) and 16 symbols for Y polarization (YI, YQ), there are 256 (=16×16) symbol points. Accordingly, ordinary PM-16QAM without thinning out a symbol can be described as SP256-PM-16QAM, SP128-PM-16QAM can be obtained by thinning outing symbol points alternately from SP256-PM-16QAM, and SP64-PM-16QAM, SP32-PM-16QAM and so on can be obtained by further thinning out symbol points.

In this case, the encoding control unit 120 can select an encoding method such as SP32-PM-16QAM and SP128-PM-16QAM, for example. That is to say, it is possible to make encoding methods (encoding method 1 to encoding method k) in the encoder 110 correspond to PM-16QAM, SP32-PM-16QAM, SP128-PM-16QAM, and so on.

The set-partitioning unit 231 selects one subset by selecting modulation symbols that correspond to one of polarization states of the optical carrier wave based on the output bit signals (a bit sequence $b_1$-$b_n$).

Because encoding method 1 to encoding method k described above can be set with their receiving sensitivities and code rates differing, it becomes possible to select a modulation scheme using a preferable encoding method depending on the transmission distance and the transmission capacity to be required.

Based on the constellation by ordinary 16QAM modulation, a preferable modulation scheme can be selected simply by changing an encoding method of the encoder 110 from encoding method 1 to encoding method k. This enables a change in digital signal processing to be minimized. As a result, it is possible to achieve low power consumption and easy control even though a configuration is employed in which modulation schemes used for an optical communication system can be switched depending on transmission conditions. In addition, because physical interfaces such as an optical modulator can be shared among respective encoding methods, the component count can be decreased. This also makes it possible to achieve cost reduction and easy control.

Next, an optical communication method according to the present example embodiment will be described.

In the optical communication method according to the present example embodiment, first, digital signals to be transmitted under a predetermined transmission condition over an optical carrier wave are encoded by selecting a predetermined encoding method corresponding to the predetermined transmission condition. Then symbol signals are generated by mapping encoded bit signals to modulation symbols. Lastly, an optical modulated signal is generated that is obtained by modulating the optical carrier wave based on the symbol signals.

In generating the symbol signals mentioned above, the modulation symbols are partitioned into a plurality of subsets, and a subset included in the plurality of subsets is selected based on the bit signals. One modulation symbol is selected from among modulation symbols included in a selected subset that has been selected based on the bit signals, and the bit signals can be mapped to a selected modulation symbol.

According to the optical communication method of the present example embodiment, it is possible to achieve low power consumption and easy control even though a configuration is employed in which modulation schemes used for an optical communication system can be switched depending on transmission conditions.

A Third Example Embodiment

Figure 4:
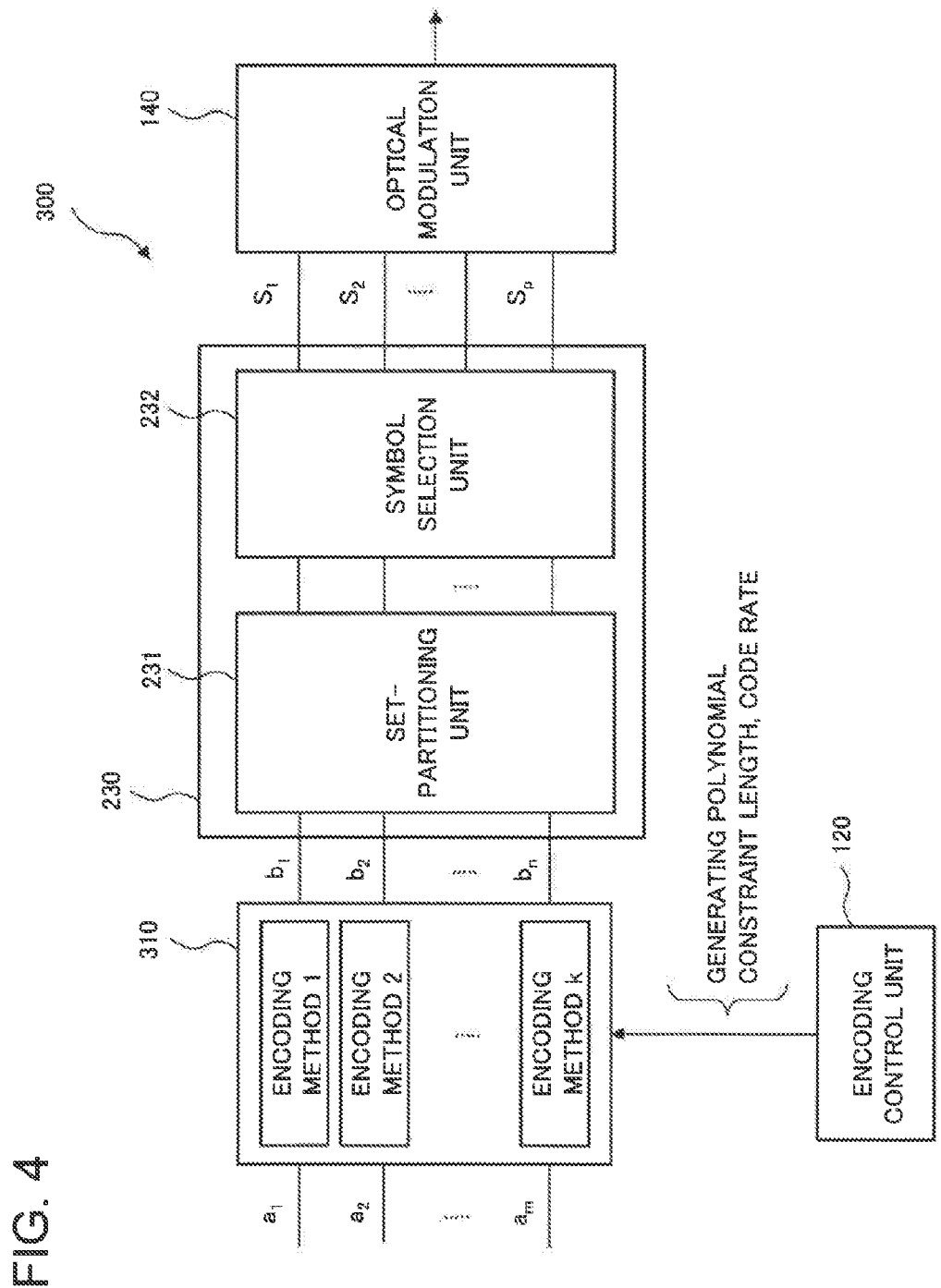
FIG. 4 is a block diagram illustrating a configuration of an optical transmitter according to a third example embodiment of the present invention.

Next, a third example embodiment of the present invention will be described. FIG. 4 is a block diagram illustrating a configuration of an optical transmitter 300 according to the third example embodiment of the present invention.

In the optical transmitter 300 according to the present example embodiment, an encoder is a convolutional encoder 310. The convolutional encoder 310 performs encoding by using one of a plurality of convolutional encoding methods that differ in at least one of a generating polynomial, a constraint length, and a code rate in convolutional encoding methods. The same configurations as those of the optical transmitter 200 according to the second example embodiment illustrated in FIG. 2 are represented by the same reference numerals, and the description of the configurations will be omitted.

The operation of the optical transmitter 300 according to the present example embodiment will be described below.

The convolutional encoder 310 receives input of m-bit digital signals $a_1$-$a_m$ inputted into the optical transmitter 300. The convolutional encoder 310 encodes the digital signals in accordance with an encoding method that is set by an encoding control unit 120, and then outputs an n-bit bit sequence $b_1$-$b_n$ of output bit signals.

A mapping unit 230 maps the bit sequence $b_1$-$b_n$ to symbols and outputs a data sequence of p elements (dimensions), $S_1, S_2, \ldots, S_p$, each of which is a symbol signal, to an optical modulation unit 140. The optical modulation unit 140 performs optical modulation based on respective data of $S_1, S_2, \ldots, S_p$ and outputs a transmission optical signal on which an optical coded modulation has been performed.

The convolutional encoder 310 is configured to be capable of selecting and setting one of k encoding methods from encoding method 1 to encoding method k that differ in generating polynomial, constraint length, code rate or the like. The encoding control unit 120 selects a preferable encoding method corresponding to a transmission distance or transmission capacity to be required from among the encoding methods from encoding method 1 to encoding method k. The encoding control unit 120 sets the convolutional encoder 310 to operate in accordance with the selected encoding method.

Figure 5:
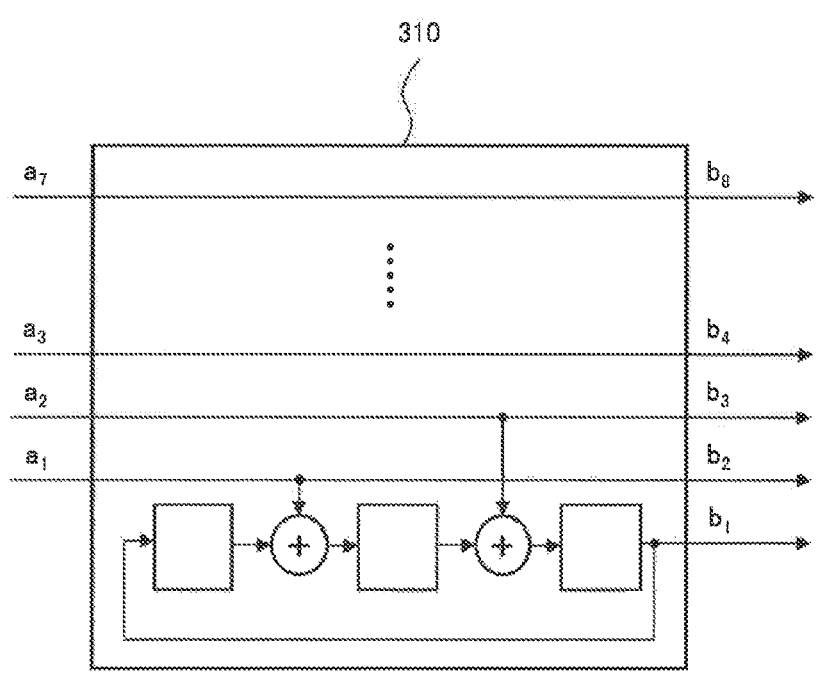
FIG. 5 is a block diagram illustrating a configuration of a convolutional encoder included in the optical transmitter according to the third example embodiment of the present invention.

FIG. 5 illustrates a configuration of a convolutional encoder with the constraint length equal to 4 and the code rate equal to 2/3, as an example of the convolutional encoder 310. The convolutional encoder 310 illustrated in FIG. 5 encodes input $a_1$ and input $a_2$ and outputs encoded bits $b_1$-$b_3$. The convolutional encoder 310 outputs input $a_3$-$a_7$ without encoding as $b_4$-$b_8$.

Figure 6:
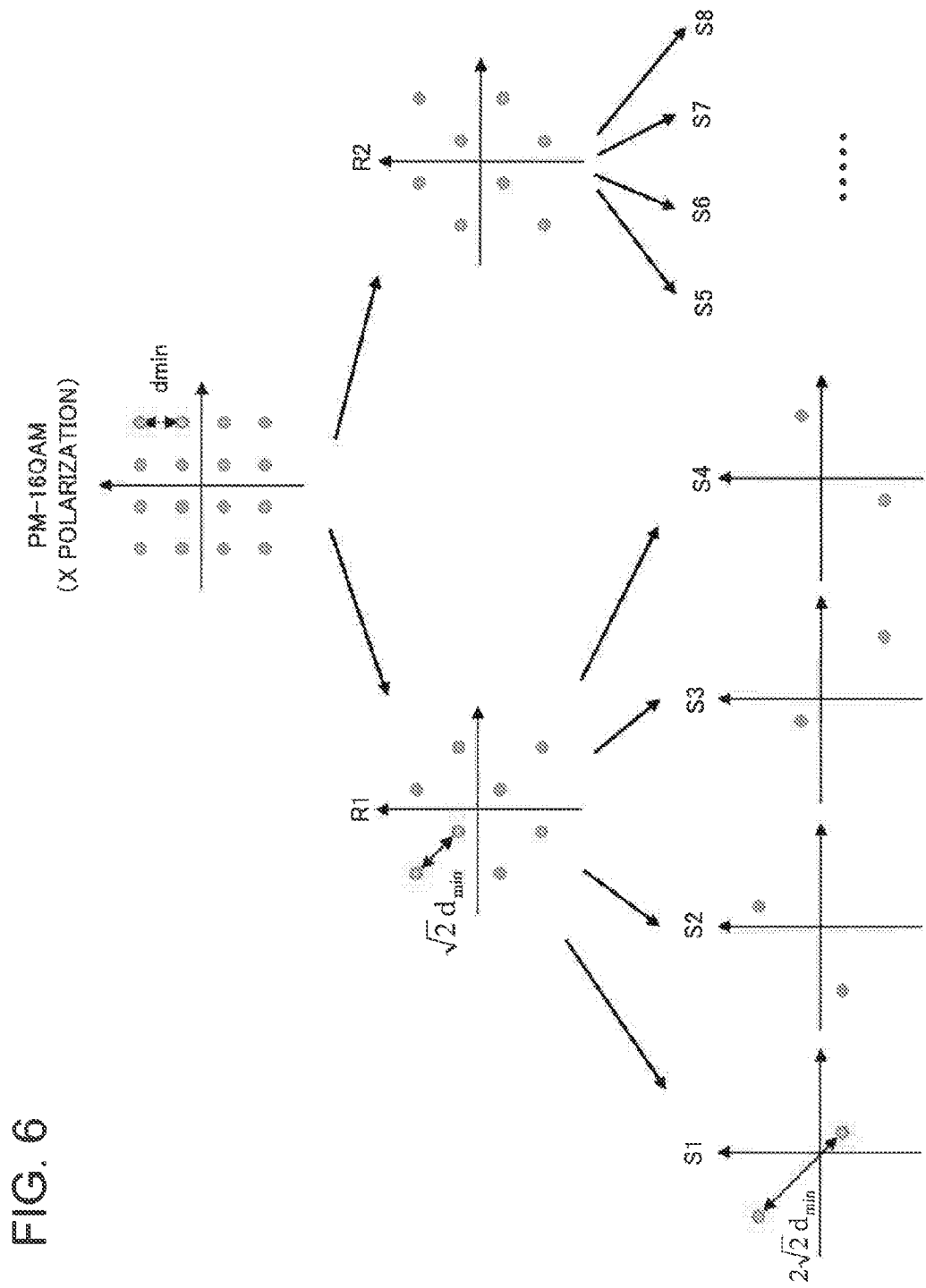
FIG. 6 illustrates constellation diagrams to explain the operation of the optical transmitter according to the third example embodiment of the present invention.

FIG. 6 illustrates an example of the set-partitioning where the convolutional encoder 310 illustrated in FIG. 5 performs the convolutional encoding on four-dimensional PM-16QAM using optical phase (I, Q) and polarization (X, Y). Although FIG. 6 illustrates constellations for X polarization only for simplicity, the actual constellations are four-dimensional constellations that are obtained by combining the constellations for Y polarization. As illustrated in FIG. 6, there are eight states (sub-constellations) composed of S1 to S8 resulting from two steps of set-partitioning. Because the constellation is made four dimensional (I, Q, X, Y) by combining a constellation for Y polarization with each state of S1 to S8, each state includes $2^5=32$ symbol points.

Next, the operation of a symbol selection unit 232 using the convolutional encoder 310 will be described.

The symbol selection unit 232 first selects one state from among the eight states (S1 to S8) using three bits $b_1$-$b_3$ that are convolutional-encoded by the convolutional encoder 310 illustrated in FIG. 5. In addition, the symbol selection unit 232 selects one of 32 symbols that are included in one of eight selected states using five bits ($b_4$-$b_8$) without encoding.

In this way, the convolutional-encoding enables the least square distance between code sequences to be extended and reach to a distance greater than or equal to the square distance between signals in the states partitioned by the set-partitioning. This makes it possible to select a modulation scheme corresponding to a transmission distance and transmission capacity to be required simply by changing a setting of the convolutional encoder 310 having a plurality of convolutional encoding methods that differ in the constraint length and the code rate, based on PM-16QAM modulation. The convolutional encoding method may be determined by setting the generating polynomial instead of the constraint length and the code rate.

As described above, according to the optical transmitter 300 of the present example embodiment, it is possible to achieve low power consumption and easy control even though a configuration is employed in which modulation schemes used for an optical communication system can be switched depending on transmission conditions.

A Fourth Example Embodiment

Figure 7:
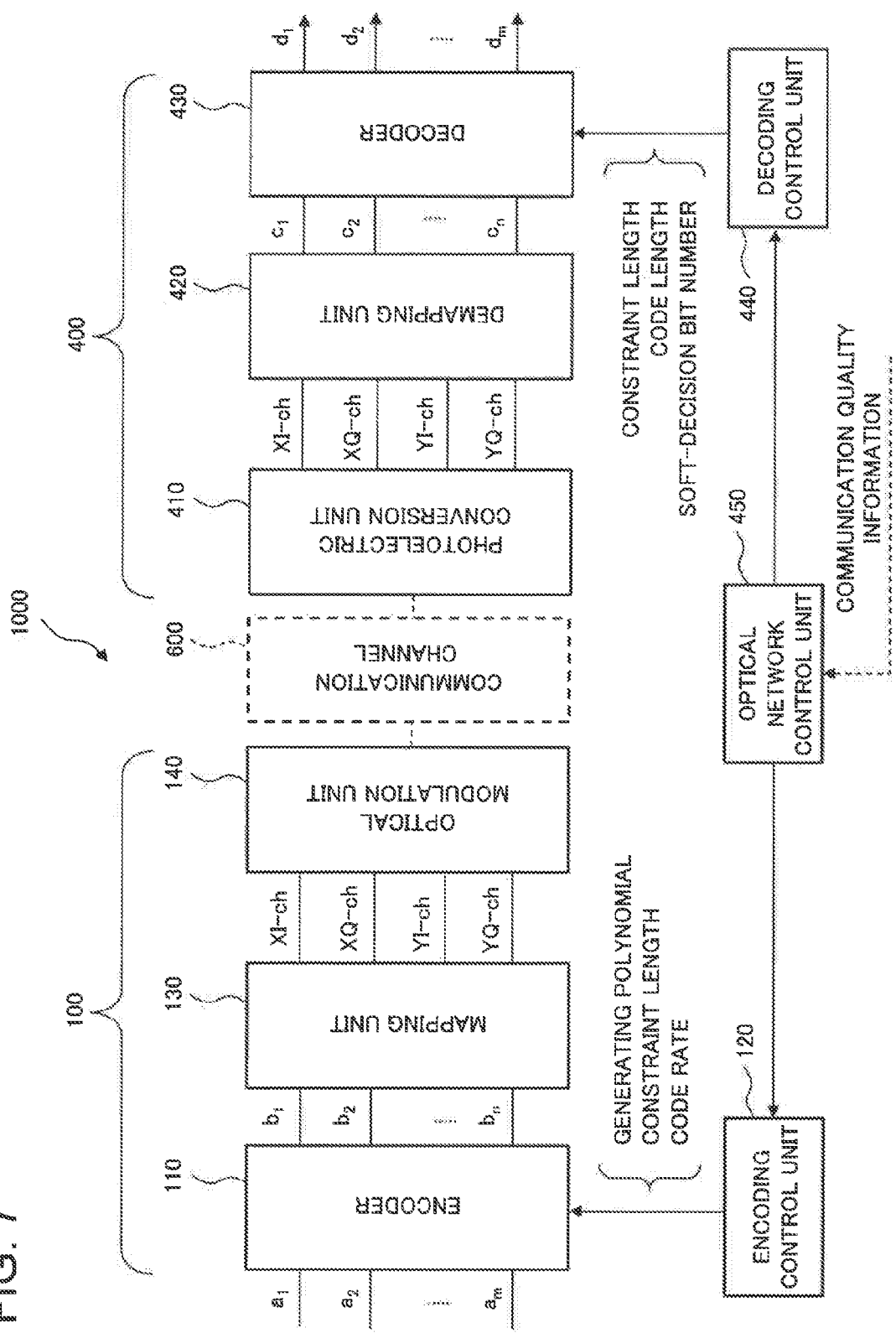
FIG. 7 is a block diagram illustrating a configuration of an optical communication system according to a fourth example embodiment of the present invention.

Next, a fourth example embodiment of the present invention will be described. FIG. 7 is a block diagram illustrating a configuration of an optical communication system 1000 according to the fourth example embodiment of the present invention.

The optical communication system 1000 includes an optical transmitter 100 configured to send out a modulated optical signal to a communication channel (an optical transmission medium) 600 and an optical receiver 400 configured to receive the modulated optical signal propagated through the communication channel 600.

The optical transmitter 100 includes an encoder 110, an encoding control unit 120, a mapping unit 130, and an optical modulation unit 140. The configuration and the operation of the optical transmitter 100 are the same as those of the optical transmitter according to the first example embodiment; accordingly, their detailed description will be omitted.

The optical receiver 400 includes a photoelectric conversion unit 410, a demapping unit 420, a decoder 430, and a decoding control unit 440.

The photoelectric conversion unit 410 receives and converts the modulated optical signal into an electrical signal, and outputs a received signal. The demapping unit 420 demaps the received signal and outputs a received bit signal. The decoder 430 receives input of the received bit signal and decodes the received bit signal by using one of a plurality of decoding methods. The decoding control unit 440 selects a predetermined decoding method from among the plurality of decoding methods and causes the decoder 430 to operate in accordance with the predetermined decoding method.

Next, the operation of the optical communication system 1000 according to the present example embodiment will be described. The operation of the optical transmitter 100 to output an optical signal on which an optical coded modulation has been performed is the same as that in the first example embodiment; accordingly, the description will be omitted.

The optical signal output from the optical modulation unit 140 in the optical transmitter 100 passes through the communication channel 600 and is received by the photoelectric conversion unit 410 in the optical receiver 400. The photoelectric conversion unit 410 converts the received optical signal into an electrical signal and outputs the received signal as digital signals in each lane of XI-ch, XQ-ch, YI-ch, and YQ-ch. The photoelectric conversion unit is configured to include a 90°-hybrid, a photodiode, a transimpedance amplifier, and an A/D (analog-to-digital) converter, which are not shown in the figure.

The demapping unit 420 performs symbol identification on the data sequences of XI-ch, XQ-ch, YI-ch, and YQ-ch and outputs an n-bit bit sequence $c_1$-$c_n$ as a received bit signal. The bit sequence $c_1$-$c_n$ is inputted into the decoder 430 having a plurality of decoding methods.

The decoder 430 selects one of the plurality of decoding methods in accordance with a setting by the decoding control unit 440. The decoder 430 outputs an m-bit bit sequence $d_1$-$d_m$ of a decoded bit sequence. The Viterbi decoding method, which is a maximum-likelihood decoding method, can be used as the above-mentioned decoding method, and the sequential decoding method can be used for a convolutional code with a longer constraint length.

The optical communication system 1000 can further include an optical network control unit 450. The optical network control unit 450 determines the predetermined encoding method and the predetermined decoding method that correspond to the predetermined transmission condition, and concurrently informs the encoding control unit 120 and the decoding control unit 440 of the predetermined encoding method and the predetermined decoding method.

Next, the operation of the optical network control unit 450 will be described in further detail.

The optical network control unit 450 selects a preferable encoding method and a decoding method based on a transmission distance and communication quality information such as a transmission capacity that are the transmission conditions required by a system operating side. Then the optical network control unit 450 concurrently informs the encoding control unit 120 and the decoding control unit 440 of the selection results. Specifically, the optical network control unit 450 instructs the encoding control unit 120 on the setting of a generating polynomial, a constraint length, a code rate and the like, and instructs the decoding control unit 440 on the setting of a constraint length, a code length, a soft-decision bit number and the like. The settings of the encoding control unit 120 and the decoding control unit 440 are concurrently changed, which makes it possible to maintain a preferable reception condition.

It is not necessarily required for the optical network control unit 450 to obtain the above-mentioned communication quality information used for the control from the system operating side. It is possible to select a preferable coding method and decoding method using information such as an optical signal-to-noise ratio and an error rate, for example.

Next, an optical communication method according to the present example embodiment will be described.

In the optical communication method according to the present example embodiment, first, digital signals to be transmitted under a predetermined transmission condition over an optical carrier wave are encoded by selecting a predetermined encoding method corresponding to the predetermined transmission condition. Then symbol signals are generated by mapping encoded bit signals to modulation symbols. An optical modulated signal is generated that is obtained by modulating the optical carrier wave based on the symbol signals.

Next, the modulated optical signal is received, and a received signal is generated by converting the modulated optical signal into an electrical signal. A received bit signal is generated by demapping the received signal. Lastly, the received bit signal is decoded by using a predetermined decoding method selected from among the plurality of decoding methods.

As mentioned above, according to the optical communication system 1000 and the optical communication method of the present example embodiment, it is possible to achieve low power consumption and easy control even though a configuration is employed in which modulation schemes used for an optical communication system can be switched depending on transmission conditions.

A Fifth Example Embodiment

Figure 8:
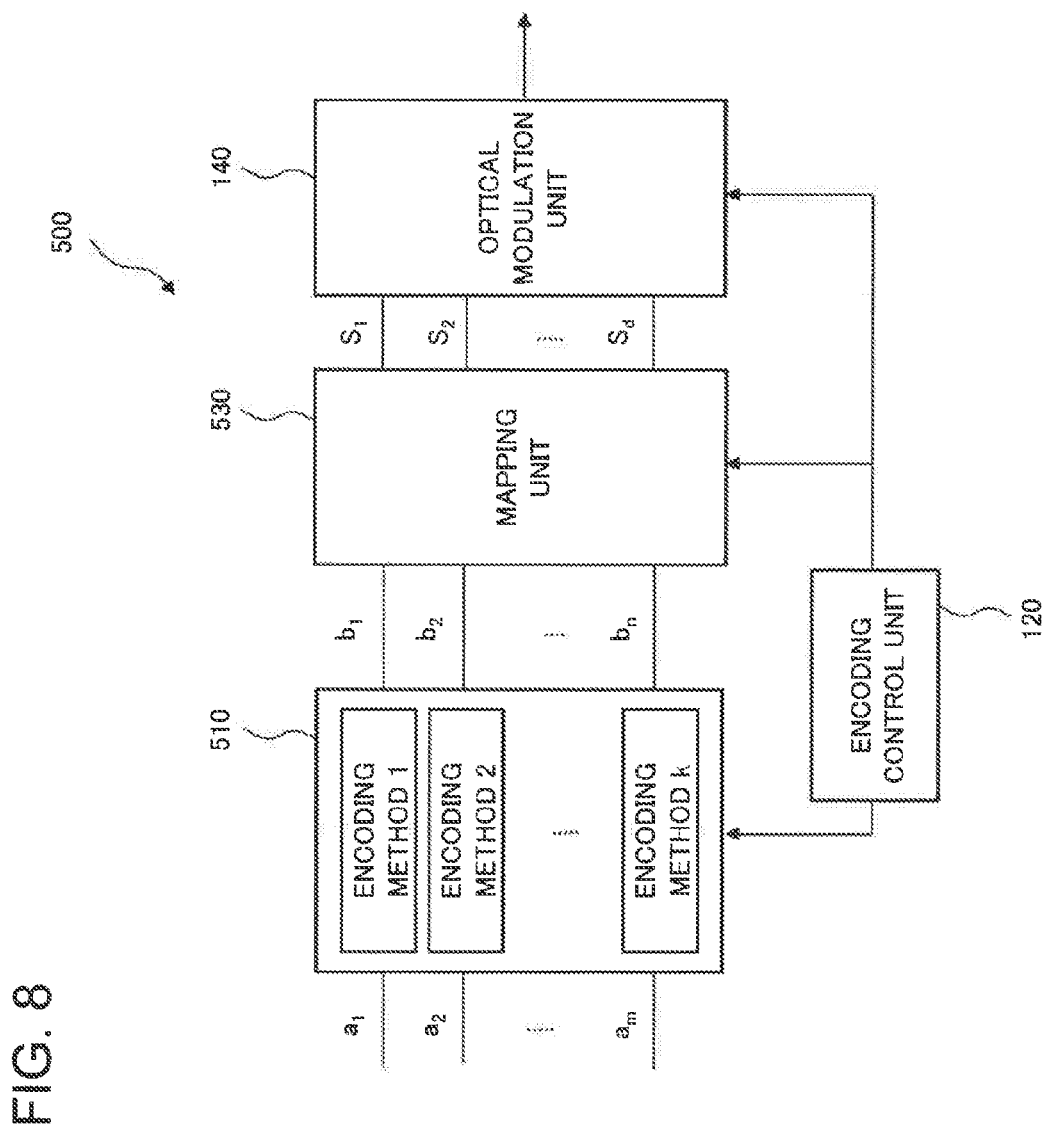
FIG. 8 is a block diagram illustrating a configuration of an optical transmitter according to a fifth example embodiment of the present invention.

Next, a fifth example embodiment of the present invention will be described. FIG. 8 is a block diagram illustrating a configuration of an optical transmitter 500 according to the fifth example embodiment of the present invention.

The optical transmitter 500 includes an encoder 510, an encoding control unit 120, a mapping unit 530, and an optical modulation unit 140. The optical transmitter 500 according to the present example embodiment differs in the configurations and the operations of the encoder 510 and the mapping unit 530 from the optical transmitter 100 according to the first example embodiment that includes the encoder 110 and the mapping unit 130. The other configurations and the operations are the same as those of the optical transmitter 100 according to the first example embodiment; accordingly, their detailed description will be omitted.

A case will be described below where the encoder 510 includes a first encoder 511, a second encoder 512, and a third encoder 513 that correspond to encoding method 1, encoding method 2, and encoding method 3, respectively. In this case, the encoding control unit 120 selects an optimum encoding method from among encoding method 1, encoding method 2, and encoding method 3, depending on a predetermined transmission condition such as a transmission distance and transmission capacity that is required for communication, and sets operation modes of the encoder 510, the mapping unit 530, and the optical modulation unit 140.

Next, the operations of the encoder 510 and the mapping unit 530 will be described in detail.

Figure 9:
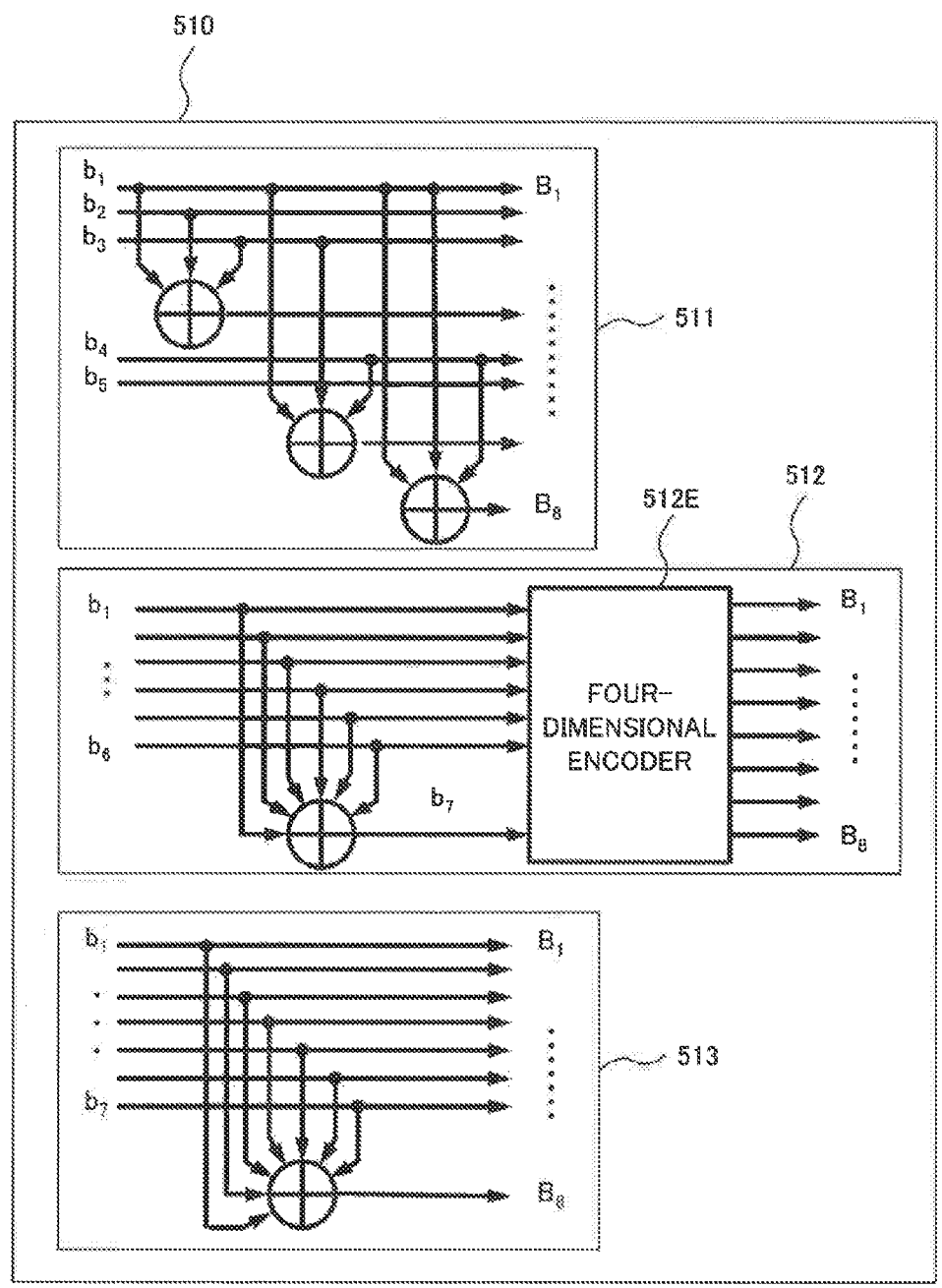
FIG. 9 is a block diagram illustrating a configuration of an encoder included in the optical transmitter according to the fifth example embodiment of the present invention.

FIG. 9 illustrates a configuration of the encoder 510. As mentioned above, the encoder 510 includes three encoders, that is, the first encoder 511, the second encoder 512, and the third encoder 513. These encoders are configured with the number of input bits equal to five bits, six bits, and seven bits, respectively. The configurations and the operations of the first encoder 511 and the third encoder 513 are described in Non Patent Literature; accordingly, the detailed description of them will be omitted.

Figures 10, 11:
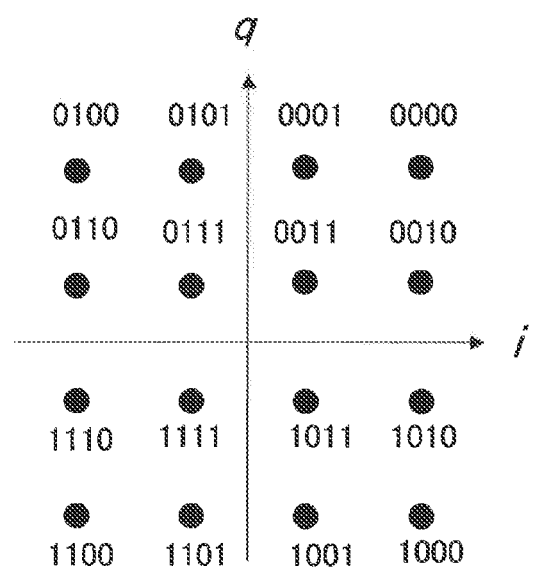
FIG. 10 illustrates logical formulae to explain the operation of a second encoder included in the optical transmitter according to the fifth example embodiment of the present invention.
FIG. 11 is a constellation diagram of 16QAM to explain the operation of the optical transmitter according to the fifth example embodiment of the present invention.

The second encoder 512 calculates the exclusive OR of the input with 6 bits of $b_1$-$b_6$ and outputs the calculated result as $b_7$. Next, a four-dimensional encoder 512E included in the second encoder 512 converts the input with 7 bits of $b_1$-$b_7$ into the output with 8 bits. FIG. 10 illustrates specific logical formulae in the four-dimensional encoder 512E.

The mapping unit 530 receives the outputs with 8 bits from the encoder 510 and allocates them to symbols so as to obtain a coding gain. It is assumed that the symbols selected here belong to a four-dimensional symbol space. In the present example embodiment, optical phases (I component and Q component) and polarization components (X polarization component and Y polarization component) of the optical carrier wave are used as the four-dimensional signal space, and symbol signals resulting from symbol mapping are output to the optical modulation unit 140.

Figure 12:
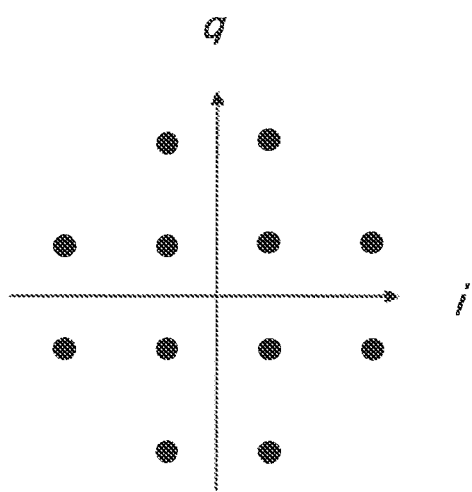
FIG. 12 is a constellation diagram of 12QAM to explain the operation of the optical transmitter according to the fifth example embodiment of the present invention.

Specifically, the symbols are allocated using mapping symbols illustrated in FIG. 11. The mapping unit 530 allocates transmission symbols in the X polarization using bits of $B_1$ to $B_4$ output from the encoder 510 and allocates transmission symbols in the Y polarization using bits of $B_5$ to $B_8$. In this case, the mapping unit 530 allocates symbols so as to produce 12QAM constellation in which the points at the four corners of 16QAM constellation are eliminated as illustrated in FIG. 12. As can be seen from FIG. 12, the signal points in 12QAM constellation can be classified into eight points with a large amplitude and 4 points with a small amplitude.

In addition, the encoder 510 in the optical transmitter 500 according to the present example embodiment is configured to perform encoding so that the amplitude of the optical signal modulated by the optical modulation unit 140 may have a correlation between two types of the polarization (X polarization and Y polarization) of the optical carrier wave. The mapping unit 530 is configured to allocate a symbol to a signal point where the amplitude is maximized in at least one polarization state.

Figure 13A:
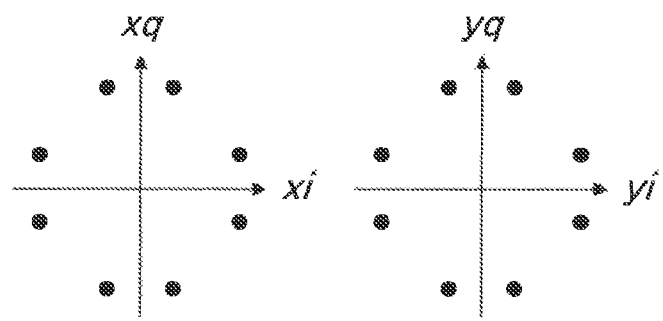
FIG. 13A illustrates a set of constellation diagrams of 12QAM in X polarization and Y polarization to explain the operation of the optical transmitter according to the fifth example embodiment of the present invention.
Figure 13B:
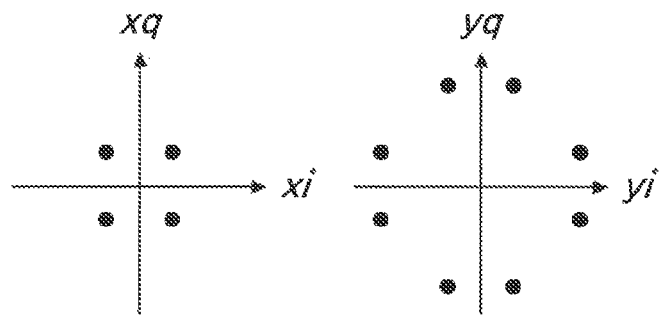
FIG. 13B illustrates another set of constellation diagrams of 12QAM in X polarization and Y polarization to explain the operation of the optical transmitter according to the fifth example embodiment of the present invention.
Figure 13C:
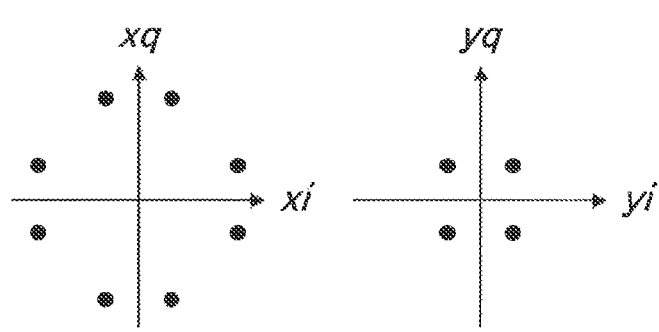
FIG. 13C illustrates yet another set of constellation diagrams of 12QAM in X polarization and Y polarization to explain the operation of the optical transmitter according to the fifth example embodiment of the present invention.
Figure 13D:
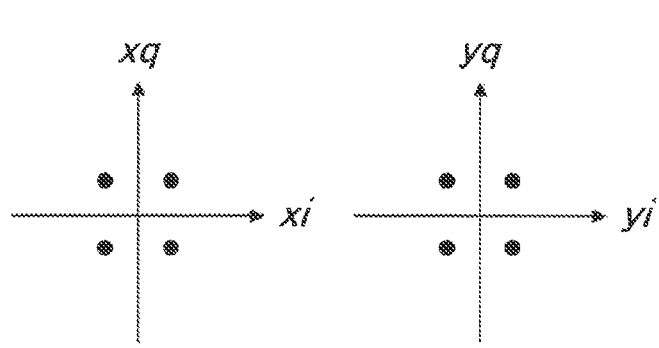
FIG. 13D illustrates yet another set of constellation diagrams of 12QAM in X polarization and Y polarization to explain the operation of the optical transmitter according to the fifth example embodiment of the present invention.

The operation of the mapping unit 530 will be described in further detail with reference to constellation diagrams of 12QAM in X polarization and Y polarization that are illustrated in FIG. 13A to FIG. 13D. As illustrated in FIG. 13A to FIG. 13C, there is a following correlation on amplitudes between symbols in the X polarization and symbols in the Y polarization. That is to say, in the case illustrated in FIG. 13A, there are symbol points with large amplitude in both the X polarization and the Y polarization. In the case illustrated in FIG. 13B, there are symbol points with small amplitude in the X polarization, and there are symbol points with large amplitude in Y polarization. Contrary to the above case, in the case illustrated in FIG. 13C, there are symbol points with large amplitude in the X polarization, and there are symbol points with small amplitude in the Y polarization. However, a constellation is excluded in which only symbol points with small amplitude are included in both the X polarization and the Y polarization as illustrated in FIG. 13D. In this way, the mapping unit 530 is configured to allocate a symbol to a signal point where the amplitude is maximized in at least one polarization state, that is, the symbol constellations illustrated in FIG. 13D are excluded, which makes it possible to decrease the number of adjacent points. This enables the bit error rate to be reduced.

The numbers of signal points illustrated in FIG. 13A, FIG. 13B, and FIG. 13C are 64 (=8×8), 32 (=4×8), and 32 (=8×4), respectively; there are 128 points in total that constitute four-dimensional symbol points. However, because the second encoder 512 generates parity bits, four-dimensional set-partitioning is performed, and symbol points are thinned out to half; as a result, the number of symbol points generated by the second encoder 512 and the mapping unit 530 becomes 64. This number is equivalent to that of conventional PM-8QAM.

Here, with Es representing the transmission power of transmission symbol per polarization state, the distance between signal points in 16QAM is equal to 0.63 $Es^{1/2}$ because the Es is the average of squares of the amplitudes of all symbols. In the case of 12QAM, on the other hand, the distance between signal points increases to 0.71$Es^{1/2}$. This effect results from eliminating the symbols at the four corners of 16QAM symbol points.

In addition, because the second encoder 512 performs the four-dimensional set-partitioning, the distance between four-dimensional signal points in 12QAM constellation increases to 1.0 $Es^{1/2}$ by a factor of $2^{1/2}$, which is greater than the distance between signal points in the conventional PM-8QAM that is equal to 0.92 $Es^{1/2}$. Consequently, the forming of 12QAM constellation can achieve the performance higher than or equal to that of PM-8QAM.

As mentioned above, using the second encoder 512 according to the present example embodiment, the amplitudes are made to correlate with each other between two types of the polarization of the optical carrier wave, which enables the receiving sensitivity to be improved. It goes without saying that the configuration to make the amplitudes between polarizations correlate with each other is applicable to not only the other QAM signals but also every symbol constellation. This configuration is also applicable to a configuration in which a case is excluded where there are symbol points with large amplitude in both the X polarization and Y polarization as illustrated in FIG. 13A, instead of the above-mentioned configuration in which a case illustrated in FIG. 13D is excluded.

Next, an optical communication method according to the present example embodiment will be described.

In the optical communication method according to the present example embodiment, first, digital signals to be transmitted under a predetermined transmission condition over an optical carrier wave are encoded by selecting a predetermined encoding method corresponding to the predetermined transmission condition. Then symbol signals are generated by mapping encoded bit signals to modulation symbols. Lastly, an optical modulated signal is generated that is obtained by modulating the optical carrier wave based on the symbol signals.

As mentioned above, the optical transmitter 500 and the optical communication method according to the present example embodiment are configured to encode digital signals by selecting a predetermined encoding method corresponding to a predetermined transmission condition. This configuration makes it possible to select a preferable modulation scheme corresponding to a predetermined transmission condition only by changing an encoding method.

It is possible to minimize a change in digital signal processing because a basic symbol constellation remains unchanged even though encoding methods are switched. As a result, it is possible to achieve low power consumption and easy control even though a configuration is employed in which modulation schemes used for an optical communication system can be switched depending on transmission conditions. It is also possible to achieve an effect of reducing the bit error rate and extending the transmission distance. In addition, because physical interfaces such as an optical modulator can be shared among respective encoding methods, the component count can be decreased. This also makes it possible to achieve cost reduction and easy control.

The present invention has been described by taking the example embodiments mentioned above as model examples. However, the present invention is not limited to the above-mentioned example embodiments. Various modes that can be understood by those skilled in the art can be used within the scope of the present invention.

This application is based upon and claims the benefit of priority from the Japanese Patent Application No. 2014-209346, filed on Oct. 10, 2014, and Japanese Patent Application No. 2015-088334, filed on Apr. 23, 2015, the disclosure of which is incorporated herein in its entirety by reference.

REFERENCE SIGNS LIST 100, 200, 300, 500 Optical transmitter
110, 510 Encoder
120 Encoding control unit
130, 230, 530 Mapping unit
140 Optical modulation unit
231 Set-partitioning unit
232 Symbol selection unit
310 Convolutional encoder
400 Optical receiver
410 Photoelectric conversion unit
420 Demapping unit
430 Decoder
440 Decoding control unit
450 Optical network control unit
511 First encoder
512 Second encoder
512E Four-dimensional encoder
513 Third encoder
600 Communication channel
1000 Optical communication system

What is claimed is:

1. An optical transceiver, comprising:
   an encoder configured to encode input digital signals by one of a plurality of encoding methods and output the encoded digital signals;
   a controller configured to control the encoder to select one of the plurality of encoding methods based on real-time optical transmission attributes of an optical carrier wave;
   a mapper configured to map the encoded digital signals to symbol signals and output the mapped symbol signals; and
   an optical modulator configured to modulate the optical carrier wave based on the mapped symbol signals.

2. The optical transceiver of claim 1, wherein the plurality of encoding methods comprises at least two of a BPSK (Binary Phase Shift Keying) encoding method, a QPSK (Quadrature Phase Shift Keying) encoding method, a 8QAM encoding method, or a 16QAM encoding method.

3. The optical transceiver according to claim 1, wherein the optical transmission attributes include at least one of a transmission capacity, a transmission distance, an error rate, or an optical signal-to-noise ratio.

4. The optical transceiver according to claim 1, wherein the controller is configured to change an encoding method to balance optical transmission distance and capacity of the digital signals.

5. The optical transceiver according to claim 1, wherein the controller is configured to change an encoding method in real time corresponding to real-time optical transmission measurements.

6. The optical transceiver according to claim 1, wherein the controller is configured to set drive signals to modulate the optical carrier wave.

7. The optical transceiver according to claim 1, wherein the symbol signals include at least one dimension of dimensions including optical phase, polarization, or wavelength of the optical carrier wave, or time.

8. The optical transceiver of claim 1, wherein the plurality of encoding methods includes a QAM (Quadrature Amplitude Modulation) encoding method; and
   wherein the mapper is further configured to map the encoded digital signals to one of a plurality of partial constellations obtained by dividing a constellation of the QAM encoding method.

9. The optical transceiver of claim 8, wherein the plurality of partial constellations include a decreased number of symbol signals or an increased distance between the symbol signals with respect to the constellation of the QAM encoding method.

10. An optical communication method, comprising:
    encoding input digital signals by one of a plurality of encoding methods and outputting the encoded digital signals;
    controlling the encoding to select one of the plurality of encoding methods based on real-time optical transmission attributes of an optical carrier wave;
    mapping the encoded digital signals to symbol signals and outputting the mapped symbol signals; and
    modulating the optical carrier wave based on the mapped symbol signals.

11. The optical communication method according to claim 10, wherein the plurality of encoding methods comprises at least two of a BPSK (Binary Phase Shift Keying) encoding method, a QPSK (Quadrature Phase Shift Keying) encoding method, a 8QAM encoding method, or a 16QAM encoding method.

12. The optical communication method according to claim 10, wherein the optical transmission attributes include at least one of a transmission capacity, a transmission distance, an error rate, or an optical signal-to-noise ratio.

13. The optical communication method according to claim 10, wherein the controlling the encoding includes changing an encoding method to balance optical transmission distance and capacity of the digital signals.

14. The optical communication method according to claim 10, wherein the controlling the encoding includes changing an encoding method in real time corresponding to real-time optical transmission measurements.

15. The optical communication method according to claim 10, further comprising setting drive signals to modulate the optical carrier wave.

16. The optical communication method according to claim 10, wherein the symbol signals include at least one dimension of dimensions including optical phase, polarization, or wavelength of the optical carrier wave, or time.

17. The optical communication method according to claim 16, wherein the plurality of encoding methods includes a QAM (Quadrature Amplitude Modulation) encoding method; and wherein the optical communication method further comprises mapping the encoded digital signals to one of a plurality of partial constellations obtained by dividing a constellation of the QAM encoding method.

18. The optical communication method according to claim 17, wherein the plurality of partial constellations include a decreased number of symbol signals or an increased distance between the symbol signals with respect to the constellation of the QAM encoding method.

\* \* \* \* \*